United States Patent [19]

Schutte

[11] Patent Number: 4,993,215
[45] Date of Patent: Feb. 19, 1991

[54] HORSE COLLAR

[76] Inventor: June Schutte, 29 Glade Rd., East Hampton, N.Y. 11937

[21] Appl. No.: 408,733

[22] Filed: Sep. 18, 1989

[51] Int. Cl.⁵ .................. B68B 3/04; A01K 27/00
[52] U.S. Cl. .................................. 54/19 R; 119/106
[58] Field of Search ............... 54/19 R, 21; 119/106

[56] References Cited

U.S. PATENT DOCUMENTS 770,070 9/1904 Johnson ........................... 119/106

FOREIGN PATENT DOCUMENTS 3044506 8/1981 Fed. Rep. of Germany ...... 119/106
2414474 9/1979 France ................................. 119/106
831822 3/1960 United Kingdom ................ 119/106

Primary Examiner—Robert P. Swiatek
Attorney, Agent, or Firm—Bauer & Schaffer

[57] ABSTRACT

A flexible belt is formed into three segments and has a ring fixed intermediate each of the end sections and the central section. The end sections are buckled to provide a collar. The rings serve as anchors for holding the horse on opposite sides of the neck.

3 Claims, 1 Drawing Sheet

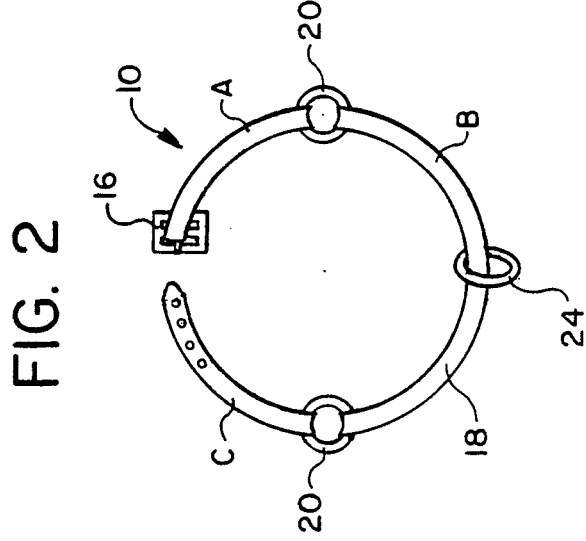
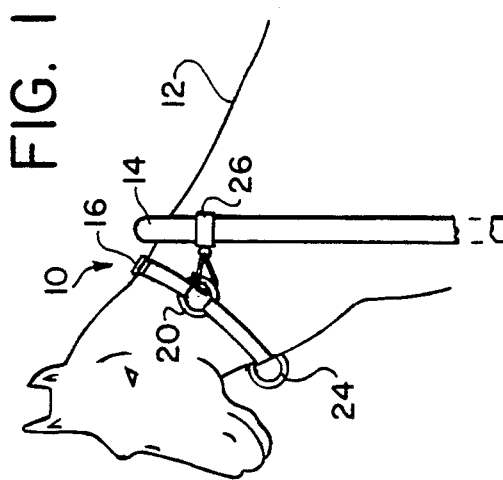
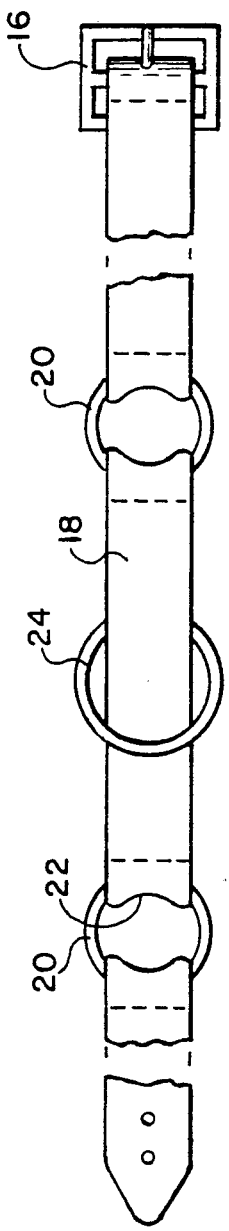

HORSE COLLAR

BACKGROUND OF THE INVENTION

The present invention relates to a horse collar, and more particularly, to an improved collar and restraining device for horses and other large animals.

A need exists for a collar to permit a horse to be temporarily led and/or held so that a single person can easily apply the tack harness or halter on a horse. The need for such a collar is particularly prevalent at horse shows where after the horse is shown or participates in an event, the horse must be rested, during which time, the harness is removed leaving the horse without means by which it can be led or held. A need for the present invention is also necessary when saddling the horse in a barn or stall where the same problem of holding or restraining the horse is felt. The need is particularly apparent where only one person is available to resaddle the horse and the person has difficulty in holding the horse steady as well as in manipulating the harness or tack.

In U.S. Pat. No. 4,376,366 a halter is shown for holding a horse by the head to a hitching post. The halter has strap means fitted about the mouth and eyes of the horse which strap means is looped over the post so that the head lies adjacent to the post. This device has many disadvantages, mainly the horse can be damaged or injured by moving against the post and it interferes with the application of the conventional harness, bit, etc. Accordingly, this device is not suitable in the environment discussed.

Thus, there is still a need for a simple, low cost collar which can be easily applied to the horse and which does not interfere with the freedom of movement of the horse, but with which the horse can be temporarily lead and held.

It is another object to provide a collar which when placed about the horse permits the horse to be restrained between a pair of spaced posts or stanchions.

It is another object of the present invention to provide a restraining device for horses and other large animals which does not interfere with the application or removal of a bridle, harness, halter, bit, saddle or other such article worn by such large animals.

The foregoing objects and advantages, together with numerous others will be apparent from the following disclosure.

SUMMARY OF THE INVENTION

According to the present invention, a horse collar is provided comprising a flexible belt formed into three segments. Fastened intermediate each section is a fixed ring. The free ends of the belt are provided with cooperating means (such as a buckle) for permitting the belt to be removably placed about the horse neck in a single continuous loop. The segments are of a length so that the intermediate fixed rings come to lie on opposite sides of the horse's neck when the belt is in place on the horse. In this connection, each of the fixed rings serve as an anchor for a tether rope, the other end of which can be tied to a post, cross tie, or stanchion. Consequently, the horse is held on each side of the neck, loosely and without undue restraint, leaving the head of the horse free and unencumbered and spaced from the post.

The collar may also be used to lead the horse, and to this end, it is intended that a loose ring be located between the fixed rings so that a lead rope may be attached thereto.

Full details of the present invention are set forth in the following description and is shown in the corresponding drawings.

BRIEF DESCRIPTION OF THE DRAWINGS

IN THE DRAWINGS:

FIG. 1 is a perspective view of an animal provided with a collar embodying the present invention;

FIG. 2 is a plan view of the collar as assembled shown in FIG. 1;

FIG. 3 is a developed plan view of the collar shown in FIG. 1.

DESCRIPTION OF THE INVENTION

In FIG. 1, the collar of the present invention, generally depicted by the numeral 10, is shown in use, to secure a horse 12 between spaced posts, to post or cross ties 14 as of a stall or the like. The collar is disposed about the horse's neck and is closed by buckle 16 or other fastener.

As seen in FIG. 2, the collar 10 comprises a flexible strap 18 made up of three sections A, B and C. Between each pair of sections (A and B) and (B and C) is a ring 20 fixed to the strap 18. The buckle 16 is secured at the free end of segment A, while segment C is provided with a plurality of holes for the buckle.

The strap 18 is preferably made of a woven material, such as plastic (e.g. nylon, polypropylene, or the like,) leather, fabric or other belting material having substantial tensile strength. In the embodiment shown, the strap 18 is cut to provide the three separate segments A, B and C and each of the rings 20 is secured by overlapping the cut ends 22 of the segment and stitching the ends together, in a conventional manner to hold the rings 20. In lieu of stitching, the strap and ring can be secured together by suitable rivets, screws, or other known means for use with belts and harnesses. On the other hand, the strap 18 may be one elongated piece and the rings 20 may be fastened on the face of the strap without cutting the strap, using conventional brackets, ring fasteners and the like. The rings 20 are preferably circular, although oblong, square or rectangular ring members may be used. The rings 20 are preferably brass to avoid rust and to permit high polish. However, stainless steel or other material may be used.

A third ring 24 is located between the two fixed rings 20 so as to freely slide along the section B of the strap 18 between the fixed rings. This permits the horse to be led easily and without undue restraint by tying a short rope to this slideable ring. The slideable ring 24 may be identical to the fixed ring 20's shape and material, or it may be made of other material and have any convenient form. A snap ring or other removable fitting to which a lead rope can be tied may also be used.

As seen in FIG. 1, the collar 10 is applied to the horse 12 in a simple and easy manner by merely looping the collar about the horse's neck 14 and fastening the buckle 16 to close the loop. Preferably, the buckle 16 is adapted, by the length of sections A and C, to be located on the nape of the neck so that the freely moveable ring depends below the horse's throat. In accordance with the invention, the several sections A, B and & C of the strap are dimensioned in length so that when the collar 10 is applied to the horse 12, the fixed rings 20 lie substantially on opposite sides of the horse's neck 14. In this manner, a short tether e.g. rope, chain, or the like, can be attached to each fixed ring 20 and to the cross tie or post or stanchion 14 securing the horse in position between the stanchions.

Since the collar 10 is merely a loop, the collar does not unduly restrain the horse, nor abrade or cut into the horse's neck. Nevertheless, by holding the horse on opposite sides of the neck, the horse may be fully restrained and held permitting the necessary grooming to take place swiftly and without difficulty.

While the collar has been shown in the drawing having two end sections and only one intermediate section, it is clear that the intermediate section may be replaced with two or more sub-sections or smaller length sections with or without intermediate fixed rings. The critical feature, of course, is the dimensioning of the sections so that two rings will lie in opposition to each other on either side of the horse's neck.

The collar of the present invention has a further distinct advantage, in that it permits the saddling and harnessing of the horse, while the horse is being held and without the need to first remove the collar. Thus full control of the horse is possible by a single groom or rider under even the most rudimentary conditions.

It will be seen from the foregoing that the advantages and objects enumerated earlier are obtained by the present invention in a simple and economical manner.

Various changes, modifications and embodiments have been suggested herein, and others will be obvious to those skilled in the art. Accordingly, it is intended that the present disclosure be taken as illustrative only.

What is claimed is:

1. A horse collar for temporarily hitching a horse to a post disposed to the side of the horse comprising:
a belt consisting of a single run strap with only three flexible sections, said sections comprising a pair of straps end sections, an intermediate strap section, a ring fixedly interposed respectively between each of said strap end sections and the adjacent intermediate strap section and means for removably fastening said strap end sections together to provide a single loop of fixed length about the neck of the horse animal; said sections being dimensioned such that said fixed rings are positioned on opposite sides of the horse's neck when said collar is fastened thereabout.

2. The collar according to claim 1, including a ring placed slidingly over said intermediate strap section.

3. The collar according to claim 1, wherein said rings are secured by lapping the ends of each section over the respective ring and securing said overlapping ends together.

* * * * *